(12) United States Patent
Atkin et al.

(10) Patent No.: US 10,180,191 B2
(45) Date of Patent: Jan. 15, 2019

(54) ZONED MANIFOLD ASSEMBLY FOR SOLENOID VALVE CONTROL SYSTEM

(71) Applicant: Numatics, Incorporated, Novi, MI (US)

(72) Inventors: Bradly Joe Atkin, Stockbridge, MI (US); Enrico De Carolis, Oakland Township, MI (US); Michael W. Hundt, Brighton Township, MI (US)

(73) Assignee: Asco, L.P., Novi, MI (US)

( * ) Notice: Subject to any disclaimer, the term of this patent is extended or adjusted under 35 U.S.C. 154(b) by 0 days.

(21) Appl. No.: 15/308,396

(22) PCT Filed: Jun. 20, 2014

(86) PCT No.: PCT/US2014/043336
§ 371 (c)(1),
(2) Date: Nov. 2, 2016

(87) PCT Pub. No.: WO2015/195131
PCT Pub. Date: Dec. 23, 2015

(65) Prior Publication Data
US 2017/0097102 A1    Apr. 6, 2017

(51) Int. Cl.
*F16K 11/22* (2006.01)
*F15B 13/044* (2006.01)
(Continued)

(52) U.S. Cl.
CPC ............ *F16K 11/22* (2013.01); *F15B 13/044* (2013.01); *F15B 13/0426* (2013.01);
(Continued)

(58) Field of Classification Search
CPC ....... Y10T 137/87885; Y10T 137/5109; Y10T 137/5283; F16K 27/003; F16K 11/22;
(Continued)

(56) References Cited

U.S. PATENT DOCUMENTS

| 4,883,091 A | 11/1989 | Weiler et al. |
| 5,048,569 A | 9/1991 | Stoll et al. |

(Continued)

FOREIGN PATENT DOCUMENTS

| EP | 0 540 998 A1 | 5/1993 | |
| EP | 0540998 A1 * | 5/1993 | .......... F15B 13/0817 |

OTHER PUBLICATIONS

Numatics Valves Catalog, 2005 and 2012 Series, Solenoid Pilot Actuated Valves, Emerson Industrial Automation, 2008, 52 pages.
(Continued)

*Primary Examiner* — Michael R Reid
(74) *Attorney, Agent, or Firm* — Reising Ethington, P.C.

(57) ABSTRACT

A zoned fluid control system in a valve manifold system has a plurality of manifold blocks connected together and a plurality of control valves mounted to the manifold blocks with the control valves being electrically actuated and pilot pressure operated. The plurality of manifold blocks forms at least first and second separate pilot pressure passages of a respective first zone and second zone not connected to each other for supplying a respective first set and second set of control valves with independently controlled pilot pressure. A pilot supply valve selectively supplies pilot pressure and shuts off pilot pressure to the second pilot pressure passage without affecting the pilot pressure to the first pilot pressure passage thereby disabling the second set of control valves as a separate zone independent from the first set of control valves.

12 Claims, 9 Drawing Sheets

(51) Int. Cl.
   *F15B 13/08*     (2006.01)
   *F15B 20/00*     (2006.01)
   *F15B 13/042*    (2006.01)
   *F15B 13/00*     (2006.01)

(52) U.S. Cl.
   CPC ...... F15B 13/0853 (2013.01); F15B 13/0896 (2013.01); *F15B 13/0814* (2013.01); *F15B 13/0817* (2013.01); *F15B 13/0839* (2013.01); *F15B 20/00* (2013.01); *F15B 2013/002* (2013.01); *F15B 2013/0428* (2013.01)

(58) Field of Classification Search
   CPC   F15B 13/0817; F15B 13/002; F15B 13/0426; F15B 13/044
   USPC ........................................ 137/269, 271, 884
   See application file for complete search history.

(56) References Cited

U.S. PATENT DOCUMENTS

| | | |
|---|---|---|
| 5,086,803 A | 2/1992 | Nakajima |
| 5,829,481 A | 11/1998 | Tajima et al. |
| 5,845,679 A | 12/1998 | Hayashi et al. |
| 5,860,445 A | 1/1999 | Yoshimura et al. |
| 5,868,157 A | 2/1999 | Yoshimura et al. |
| 5,915,666 A | 6/1999 | Hayashi et al. |
| 5,918,629 A | 7/1999 | Hayashi et al. |
| 5,971,022 A | 10/1999 | Hayashi et al. |
| 5,983,921 A | 11/1999 | Miyazoe et al. |
| 5,992,460 A | 11/1999 | Akimoto |
| 5,996,609 A | 12/1999 | Akimoto et al. |
| 6,053,198 A | 4/2000 | Atkin et al. |
| 6,142,182 A | 11/2000 | Akimoto |
| 6,164,323 A | 12/2000 | Smith et al. |
| 6,257,277 B1 | 7/2001 | McGeachy |
| 6,405,754 B1 | 6/2002 | McGeachy |
| 6,408,868 B2 | 6/2002 | Rondreux et al. |
| 7,171,985 B2 | 2/2007 | Eltrop |
| 7,204,273 B1 | 4/2007 | Zub et al. |
| 7,380,571 B2 | 6/2008 | Okamoto |
| 7,438,088 B2 | 10/2008 | Matsumoto et al. |
| 7,677,264 B2 | 3/2010 | Miyazoe et al. |
| 2005/0040354 A1 | 2/2005 | Fukno et al. |
| 2009/0212247 A1 | 8/2009 | Inaba et al. |
| 2012/0085953 A1 | 4/2012 | Kato |

OTHER PUBLICATIONS

International Search Report and Written Opinion, PCT Appln. No. PCT/US2014/043336, Filed Jun. 20, 2014, Applicant: Numatics, Incorporated, dated Jan. 12, 2015, 10 pages.

International Preliminary Report on Patentability, PCT Appln. No. PCT/US2014/043336, Filed Jun. 20, 2014, Applicant: Numatics, Incorporated, dated May 20, 2016, 10 pages.

* cited by examiner

ZONED MANIFOLD ASSEMBLY FOR SOLENOID VALVE CONTROL SYSTEM

TECHNICAL FIELD

The field of this invention relates to pneumatic solenoid valve control systems with a manifold assembly.

BACKGROUND OF THE DISCLOSURE

Industrial automation has been greatly improved by using manifold assemblies that direct pneumatic pressure to control many control devices. The manifold assemblies incorporate electrical actuated solenoid valves that control the direction of pneumatic flow for actuating these control devices. These manifold assemblies are commonly assembled in modular form from a plurality of manifold blocks. The manifold assembly has a common pilot pressure passage and main pressure passages that are connected to the solenoid valves which in turn control the flow of main pressure to a respective control device. The solenoid actuated control valve has a main valve or spool and a solenoid actuated pilot valve that provides pilot pressure to the main valve. Pilot pressure to actuate a main valve is well known. If the pilot pressure connected to the solenoid actuated valves is independently supplied from the main pressure, the actuation of the main valve in the solenoid can take place only when both pilot pressure is supplied to the valve and electrical actuation of the solenoid valve occurs.

These manifolds can incorporate many manifold blocks with many valve stations and solenoid valves which in turn control many control devices. It is often desired to shut down one or more of the control devices without shutting down all the control devices connected to the manifold assembly. A shutdown may be due to routine maintenance of the device or for repairing unexpected malfunction of or damage to the device. Previous efforts to control individual valve stations were accomplished by shutting off the electrical power to an individual solenoid that controls the downstream device. The application of zoned power has also been used to control the electrical power to a group of devices in a particular zone such that only that zone may be turned off without turning off other zones of power. However, these zones of power have introduced complications to the modular assembly by increasing the number of different parts.

Manifold assemblies need to accommodate guidelines for different levels of industrial architecture that have recently been proposed or implemented. One guideline level calls for moving the solenoid valve to a mid-position to prevent pneumatic flow to the device when the device is inactivated. Another guideline level of architecture calls for detection of any movement of the device during shutdown and also provides further warning signals of the motion during shutdown. A further level or architecture calls for providing a spring loaded brake that will prevent the device from further motion when air is released for actuating the spring loaded brake.

Manifold assemblies commonly have a sandwich block interposed between a manifold block and the solenoid actuated valve. These sandwich blocks have been used to provide shut off valves for the main pressure, introduction of separate main pressure to a single valve station or to provide and isolate the exhaust of a single valve station from the manifold.

What is now desired is to provide redundancy to the architecture to further prevent inadvertent actuation of the solenoid by selectively eliminating and exhausting pilot pressure for the solenoid actuated valve. Further what is desired is both a pilot pressure system and an electrical circuit system that provides zones in the manifold assembly without the need for a great increase in inventory parts. What is further desired is a manifold assembly that can introduce a separate pilot pressure to a zone of solenoid actuated valves via a sandwich block interposed between the manifold block and the solenoid actuated valve.

SUMMARY OF THE DISCLOSURE

In accordance with one aspect of the invention a valve manifold assembly has a plurality of manifold blocks connected together with valve stations on one surface of each manifold block. The valve manifold assembly includes a first pilot pressure supply operably connectable to a first set of control valves electrically actuated and a first set of control valves mounted to a first set of valve stations on the manifold blocks. A first pilot pressure passage is operably connectable to the first pilot pressure supply for supplying pilot pressure to the first set of valve stations.

A second pilot pressure supply is operably connectable to a second set of control valves that are electrically actuated. The second set of control valves is mounted to a second set of valve stations on the manifold blocks. A second pilot pressure passage is operably connectable to an actuable pilot supply valve for selectively supplying zoned pilot pressure to the second set of valve stations such that the second set of control valves may be deactuated if pilot pressure is shut off thereto while the first set of control valves remain connected to pilot pressure.

Preferably, the first pilot pressure passage is separated from the second pilot pressure passage by a closure within one of the manifold blocks. The closure is preferably within the one manifold block that has at least two valve stations with one station being part of the first set of valve stations and at least a second valve station being part of the second set of valve stations. In one embodiment, the closure is a seal member press fitted into a pilot bore separating the first pilot passage from the second pilot passage.

It is desirable that a sandwich block is interposed between one of the manifold blocks and one of the control valves. The sandwich block has an exterior connector to be connectable to a pilot supply leading from the pilot supply valve. The sandwich block also has a port in fluid connection to the exterior connector for introducing pilot pressure from the pilot supply valve to the one control valve. It is desirable that the sandwich block has a passage from the port to the manifold block to introduce pilot pressure to the second pilot pressure passage. In one embodiment, the first set of control valves is electrically actuated from a first electrical power supply and the second set of control valves is electrically actuated from a second electrical power supply.

According to another aspect of the invention, a sandwich block is constructed to be interposed between a manifold block and a control valve that is solenoid actuated and pilot pressure operated. The sandwich block has an inlet for receiving pilot pressure from a pilot supply valve external from the manifold block. The inlet has a passage to an outlet operably connectable to the control valve such that the pilot supply valve can selectively supply pilot pressure to the control valve.

In accordance with another aspect of the invention, a zoned fluid control system in a valve manifold system has a plurality of manifold blocks connected together and a plurality of control valves mounted to the manifold blocks with the control valves being electrically actuated and pilot pressure operated. The plurality of manifold blocks forms at least first and second separate pilot pressure passages of a respective first zone and second zone not connected to each other for supplying a respective first set and second set of control valves with independently controlled pilot pressure. A pilot supply valve selectively supplies pilot pressure and shuts off pilot pressure to the second pilot pressure passage without affecting the pilot pressure to the first pilot pressure passage thereby disabling the second set of control valves as a separate zone independent from the first set of control valves.

Preferably, an electrical control circuit independently supplies electrical power to the first set and second set of control valves such that in order for the second set of control valves to be actuated, the electrical control circuit needs to supply electrical power to the second set and the pilot supply valve must be open to supply pilot pressure to the second separate pilot pressure passage in the separate zone. Preferably, the first and second pilot pressure passages are aligned through the manifold block. It is also desirable that a manifold block at the beginning of a zone has an external fitting to be connected to an electrical power supply and a respective sandwich block is interposed between the manifold block and a control valve mounted thereon for supplying pilot pressure from the pilot supply valve to the second separate pilot pressure passage of the second zone.

In accordance with another aspect of the invention, a valve manifold block for zoned fluid control has a first zone and second zone between connected valve manifold blocks. The manifold block has a plurality of fluid pathways therethrough, and ports forming a first and second valve station and controlled by respective first and second control valves operably mounted thereto. A circuit board passage passes through the manifold block from a first side to a second side. A pilot passage inlet port and a pilot passage outlet port are on respective first and second sides. The pilot passage inlet port is part of the first zone and not in operable communication with the pilot passage outlet port which is part of the second zone. A circuit board is received in the circuit board passage and has a first edge in proximity with the first side and with a plurality of first electrical contacts, and a second edge in proximity with the second side with a plurality of second mating electrical contacts to connect to respective first electrical connector in another printed circuit board in another downstream valve manifold block.

The circuit board has a common voltage connector contact at said first edge and leads to a first jumper terminal on the circuit board that receives electrical power from a first zone. The valve manifold block has an external electrical connector for connecting a zoned power source to a second jumper terminal on the circuit board, a zoned common voltage connector contact at the second edge, and in electrical connection with the second valve station to drive said second control valve.

The first and second jumper terminals are selectively placed in contact with a common jumper terminal that is in electrical connection with the first control valve such that the first control valve can be powered by either electrical power from said first zone from the common voltage connector at the first edge or from the second zoned power source from the zoned common voltage connector from the external connector.

It is preferred that the first and second jumper terminals are arranged with the common jumper terminal on a three pin header with a two pole shunt being selectively positioned on said common line with either of said first or second jumper terminal.

In accordance with another aspect of the invention, a manifold block for a valve manifold assembly has a least one valve station for mounting a control valve thereon and a circuit board mounted in a duct through the manifold. The circuit board has a first circuit at an edge for supplying a first source of electrical power; and a second circuit for supplying a second source of electrical power. An electrical connector supplying a second source of electrical power to the second circuit is mounted at a side of said block. The circuit board has a jumper station thereon for selectively controlling whether the first circuit or the second circuit supplies electrical power to the at least one valve station in the manifold block.

BRIEF DESCRIPTION OF THE DRAWINGS

Reference now is made to the accompanying drawings in which.

DETAILED DESCRIPTION OF THE PREFERRED EMBODIMENT

Figure 1:
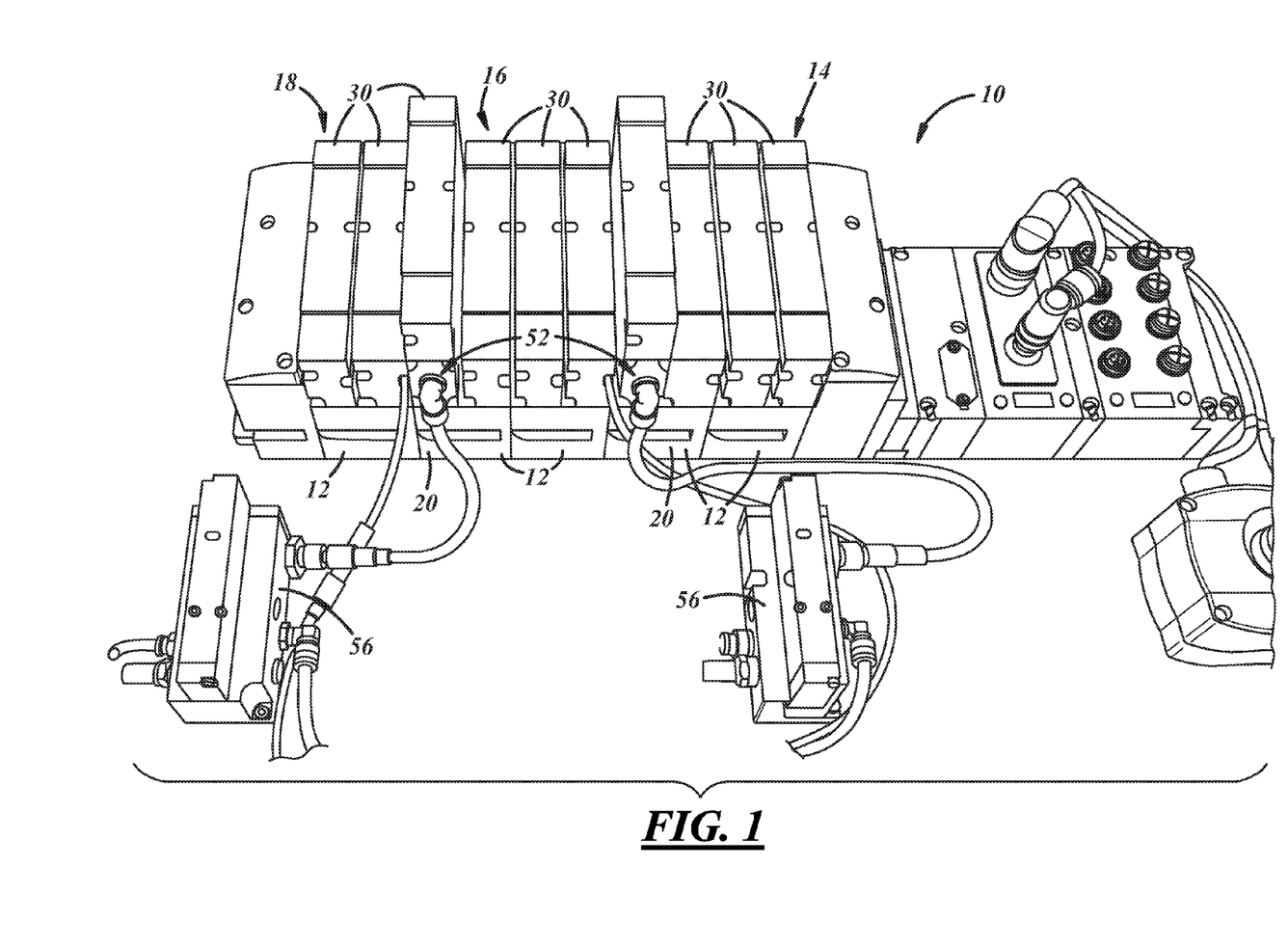
FIG. 1 is a perspective and partially schematic overview of one arrangement according to one embodiment of the invention.
Figure 2:
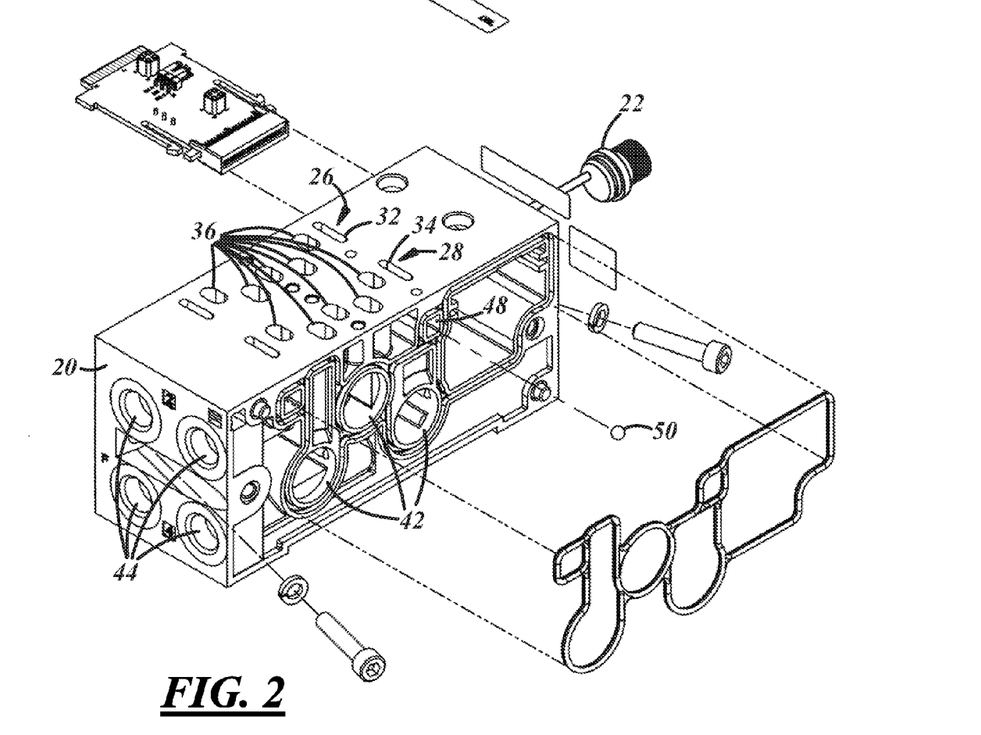
FIG. 2 is a partially exploded enlarged view of a zoned power manifold block from an opposite side from that illustrated in FIG. 1 to show terminals 44.
Figure 3:
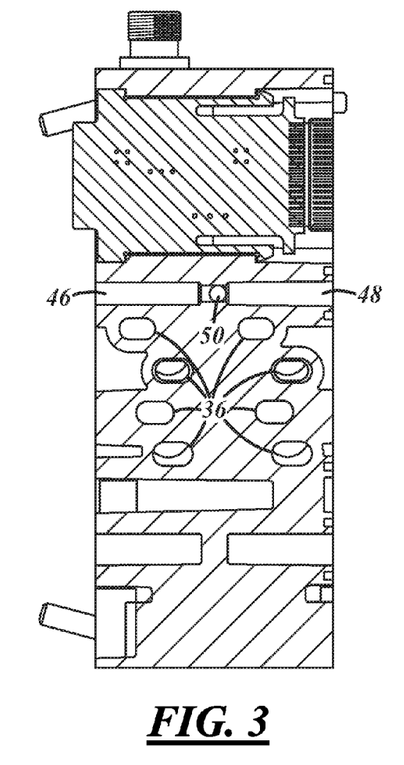
FIG. 3 is a cross sectional view of the zoned power manifold block shown in FIG. 2.

Refereeing now to FIGS. 1-3, a fluid control system 10 is modular in nature and depending on the application has a plurality of valve manifold blocks 12 interconnected together. The manifold blocks 12 may be in different zones 14, 16, and 18 for example with a modified manifold block 20 at the start of the second zone 16, third zone 18, and any sequential zone. As illustrated in FIG. 2, each manifold block 20 has two valve stations 26 and 28 that mount two control valves 30. Each valve station 26, 28 includes a set of ports as described below. Each manifold block 20 has an electrical connector 22 for introducing a zoned electrical power supply for the respective zone. Each of the zoned electrical power supply can be independently turned off.

As shown in FIGS. 2 and 3, the manifold block 20 at the beginning of each zone 16 and 18 has the respective valve stations 26 and 28 with a respective pilot pressure port 32 and 34 that is connected to a pilot chamber in a respective solenoid actuated valve pilot pressure chamber (not shown) of a standard control valve 30 that is electrically actuated and pilot operated. For example, electric actuation of a solenoid opens an internal pilot valve in the control valve 30 that then supplies pilot pressure to one side of a spool valve which moves the spool valve. The spool valve controls the flow between different ports 36 at a respective valve station 26, 28 in the manifold block 20. These ports 36 are in connection with transverse ducts 42 that align with similar transverse ducts in other manifold blocks. Some of these ports 36 may also be in communication to terminals 44 that are connected to downstream devices (not shown) to both supply main pressure to the devices and to allow the main device to exhaust pneumatic pressure back through the manifold block.

As shown in FIGS. 2 and 3, the manifold block 20 has pilot pressure port 32 connected to a transverse first pilot passage 46 connected to previous manifold blocks 12 in a previous zone. Similarly pilot pressure port 34 is connected to a transverse second pilot passage 48 that in turn is connected to downstream manifold blocks 12 in the next zone. A plug 50 in the form of a ball is press fitted to separate and seal pilot passage 46 from pilot passage 48.

Figures 4, 5:
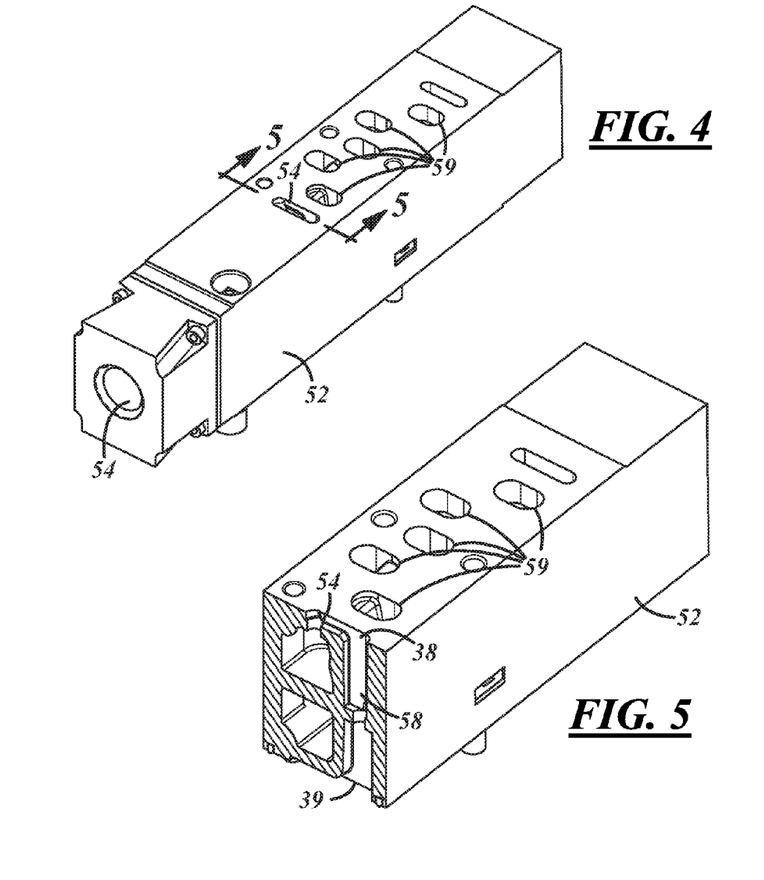
FIG. 4 is an enlarged perspective view of a sandwich block shown in FIG. 1.
FIG. 5 is a cross sectional view along 5-5—shown in FIG. 4.

As shown in FIG. 1, a pilot sandwich block 52 is interposed between a block 20 and a control valve 30 at a valve station 28. The pilot sandwich block 52 as shown in FIGS. 4 and 5 has an external pilot port 54 that is operably connected to a pilot supply valve 56 that provides independent pilot pressure to the second valve station 28. The pilot supply valve 56 is conventional in structure and can be independently actuated to an "on" or open position to supply pilot pressure and an "off" e.g. exhaust position. The pilot sandwich block 52 has its port 54 connected to a pilot supply outlet 38 that leads to the control valve 30 at valve station 28. As shown in FIG. 5, the pilot sandwich block 52 also has a through duct 58 that is connected to lower port 39 that seats on and is operably connected to pilot port 34 on the valve station 28 that leads to the second pilot passage 48 in the manifold to supply the rest of the second zone. The remaining ports 59 operably connect the ports 36 on station 28 to the control valve in a desired fashion.

Figure 6:
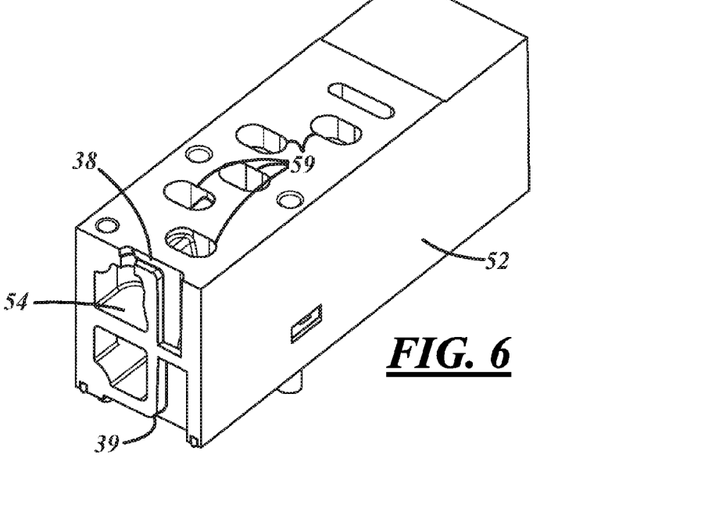
FIG. 6 is a cross sectional view similar to FIG. 5 showing a sandwich block configured to supply a single valve station.

Referring now to FIG. 6, if it is desired to have the pilot pressure feed only the control valve 30 on the single station 28, the sandwich block 52 is modified such that the through duct 58 is eliminated. In this fashion, the external pilot pressure only feeds the single valve station 28 and is separated from either the first pilot passage 46 or the second pilot passage 48 in the manifold block. The lower port 39 is a blind hole and seals off port 34.

Figure 11:
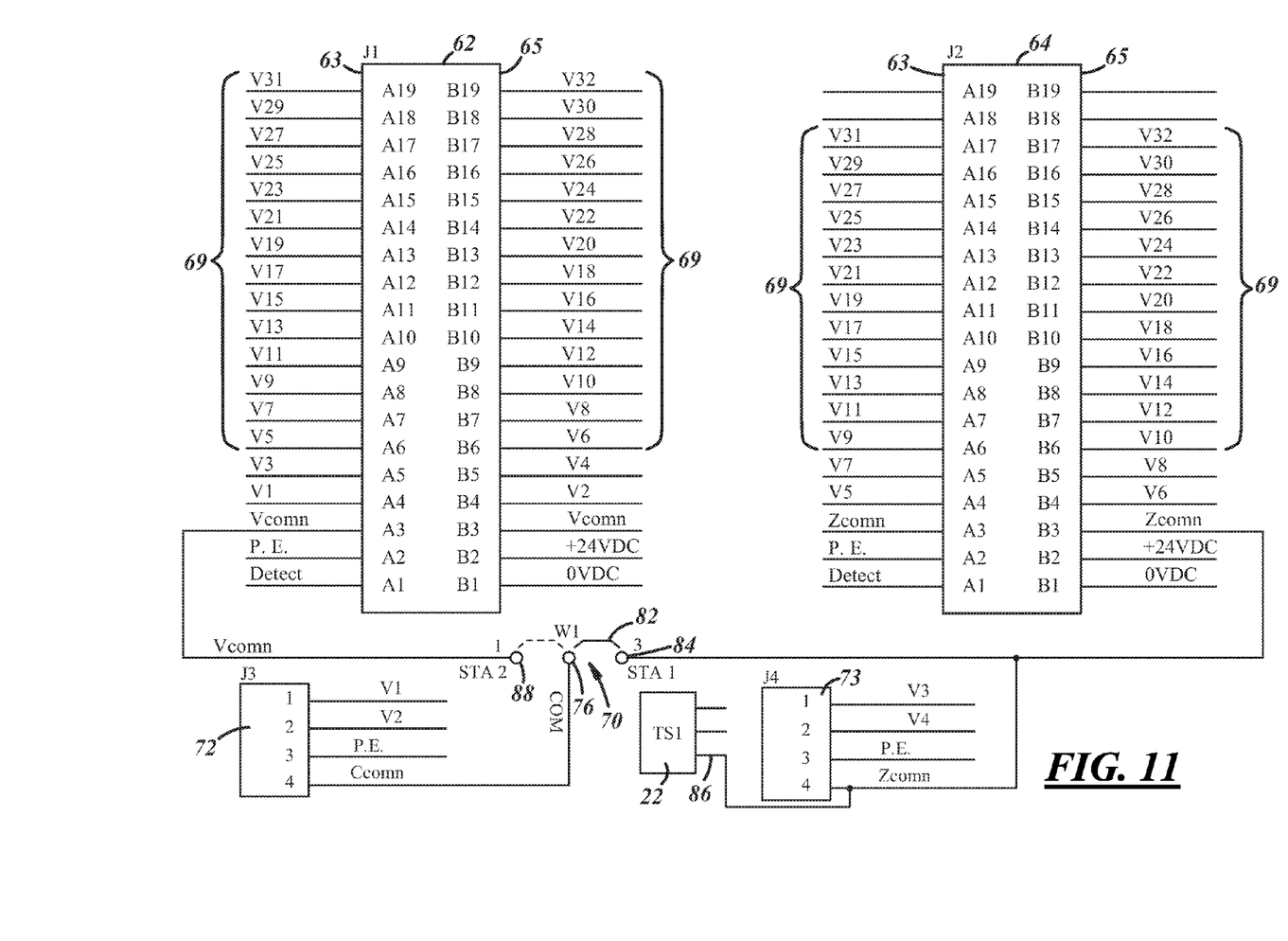
FIG. 11 is a schematic end view of the first and second edges of the circuit board for a double solenoid valve unit as shown in FIG. 1 illustrating the terminals connections to respective circuits in the circuit board and the connection to the shunt in a first position and second position (in phantom)

Referring now to FIGS. 7-11, an electrical circuit board 60 for the manifold block 20 is described. The circuit board 60 has a first edge 62 and second edge 64 with trace contacts 66 on both faces 63 and 65 of the board. As shown in FIG. 11, the terms labeled A or B e.g. A1-A19 and B1-B19 refer to the positions of the contacts and conductive lines on the respective sides A, B of the circuit board 60 at each edge 62 and 64. The terms labeled with the V as prefix e.g. V1, V2, etc. refer to the downstream valve number that the circuit operates counting from the shown circuit board 60. On the present circuit board 60, only the first four valve numbers V1-V4 are connected to the valves on the manifold block 20. The remaining set 69 of valve lines V5-V32 have the traces 68 that are merely stepped down from the trace contacts 66 at the first edge 62 to the trace contacts 66 at the second edge 64. For example, V5 at position A5 at the first edge 62 drops to position A4 at the second edge 64 to be connected to a V1 contact at position A4 of a sequential board. Top contact positions A19, B19, A18, and B18 at edge 64 are not connected to any conductive lines on the board. In this particular shown circuit board 60, V31 indicates that the valve manifold using that circuit board is limited to a maximum of thirty-one solenoid valves. Other layouts for the circuit board lines are possible to provide for less or more solenoid valves.

Each circuit board has pin connector sets 72 and 73 mounted thereon. The contacts A4 and B4 corresponding to V1 and V2 are operably connected to pin connector set 72 via circuit traces 75 and 77. The pin connector set 72 is connected to the control valve 30 at the first station 26. Pin connector sets 72 and 73 are also connected to protective earth line PE connected to contact A2 through traces 79. Pins connector set 72 is connected to a middle contact 76 at jumper station 70 through circuit trace 81. In addition, one of the trace contacts B3 connected on the first edge 62 labeled Vcom is also connected to a contact 88 at a jumper station 70 on the circuit board through circuit trace 83.

The electrical connector 22 is also connected to the circuit board 60 at contact 86. The contact 86 leads through circuit trace 85 to the contact 84 at jumper station 70, and pin connector set 73 pin. Pin connector set 73 is connected to control valve 30 at valve station 28. In this manner, the electrical connector 22 powers the control valve 30 at the second station 28 in the second zone. The pin connector set 73 finishes the circuit by connecting the connector 22 via circuit trace 87 to an outgoing Zcom contact trace A3 and B3 at the second edge 64 to power subsequent manifold blocks 12.

Figure 7:
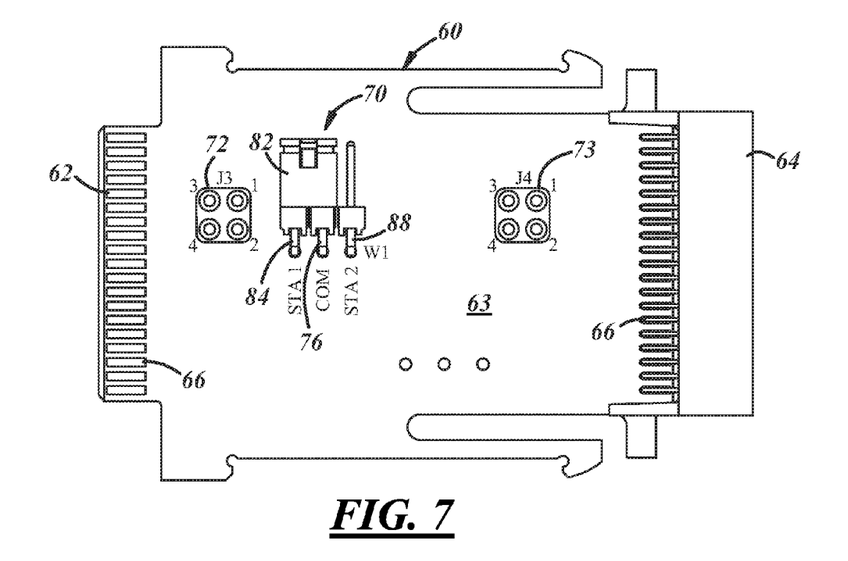
FIG. 7 is an enlarged view of the circuit board shown in FIG. 2 with a shunt shown in a first position.
Figure 8:
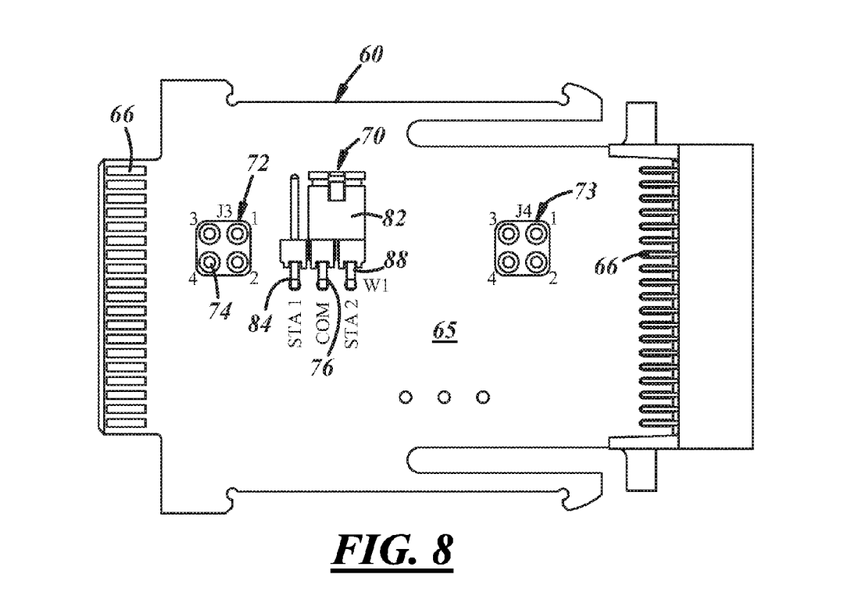
FIG. 8 is a view similar to FIG. 7 with the shunt shown in the second position.
Figure 9:
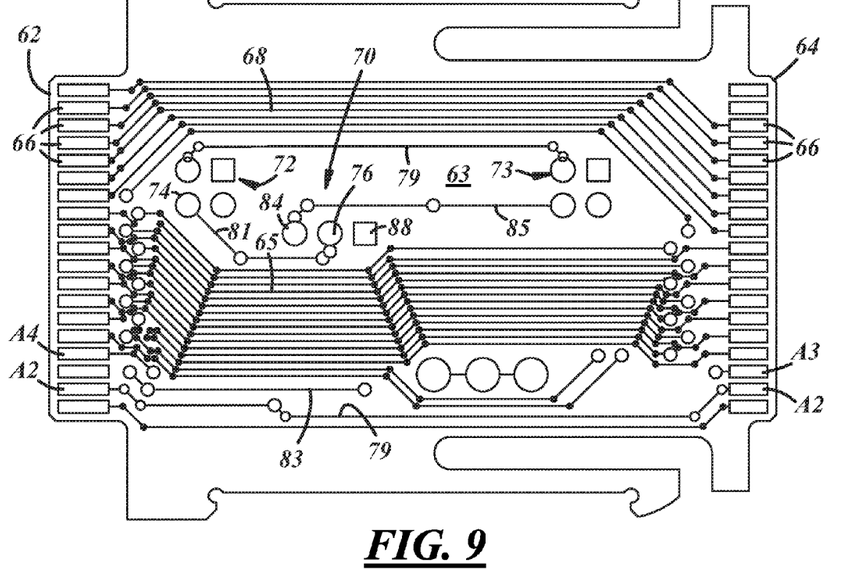
FIG. 9 is a schematic view of a first face of the circuit board shown in FIG. 7 illustrating the trace lines.
Figure 10:
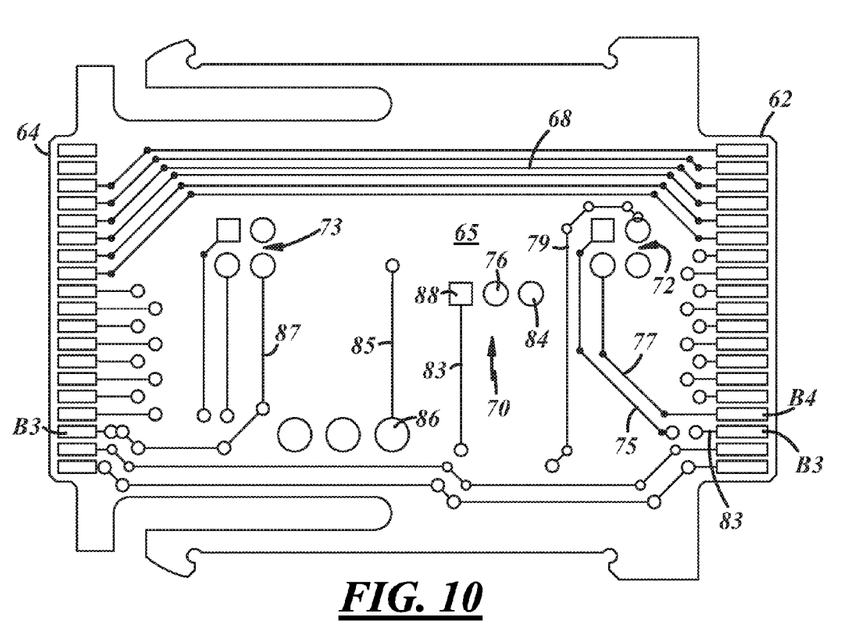
FIG. 10 is a schematic view of a second face of the circuit board shown in FIG. 7 illustrating the trace lines.

A shunt 82 is connectable to the jumper station 70 at a first position as shown in FIG. 7 or a second position as shown in FIG. 8. As shown in FIG. 7, the shunt 82 bridges contact 84 with contact 76. Thus, the power from the electrical connector 22 passes to pin set 72 as well as powering pin set 73. In this position, valve station 26 and valve station 28 are both powered by the electrical connector 22 and can be said to be in the same electrical zone or powered by the same electrical supply. The contact 88 is open and in effect Vcomn through its trace 83 is not connected to anything in this configuration.

If it is desired to have valve station 26 in a previous zone i.e. powered by a different electrical supply, and thus, valve station 28 becomes the first station in a sequential zone, shunt 82 is moved to the position shown in FIG. 8 and also FIG. 11 in phantom. In this position, the Vcomn terminal A3 through trace 83 connects from contact 86 to contact 76 and powers pin set 72. Thus, valve station 26 is powered by Vcomm from contact 88 while the second valve station 28 remains powered by the external electrical connector 22 via circuit path 85 to pin connector 73. The electrical connector 22 is still operably connected through circuit path 87 to the Zomm contact at the second edge which can provide power to downstream electrical circuit boards in manifolds 12. Valve station 26 now receives separate electrical power and a separate pilot pressure than valve station 28. The downstream manifolds 12 are thus in zone 2 and also receive the zoned electrical power and zoned pilot pressure until another zone is started.

When a zone of the valve manifold needs to be deactuated, i.e. valve station 28 needs to be turned off, the electrical power through electrical connector 22 can be turned off in addition to the external pilot supply valve 56 being turned off. Thus, zone 2 can be turned off while the remaining zones 1 and 3 can remain actuated. As now becomes apparent, each zone can be independently turned on or off. For example, zone 2 can be off while both zones 1 and 3 can remain on. The control valves 30 in each zone will not work unless both the pilot pressure from pilot supply valve 56 is supplied and electrical power from the electrical connector 22 is supplied. Thus, by having both the electrical power and pilot pressure deactuated in a turned off zone, a redundancy is introduced to assure that the zone remains off.

Referring now to FIGS. 12-17, a modified manifold block 120 includes four valve stations of which only valve station 127 and 128 are shown. A pilot pressure cover plate 152 is mounted over a first valve station and has an external pilot port 154 for connection to a pilot supply valve (not shown) and a passage 155 that leads to a pilot inlet 141 that leads to the transverse pilot duct 142 through the manifold block. A cover plate 157 is mounted over a second valve station to seal the second valve station and a modified circuit board 160 is shown.

Figure 12:
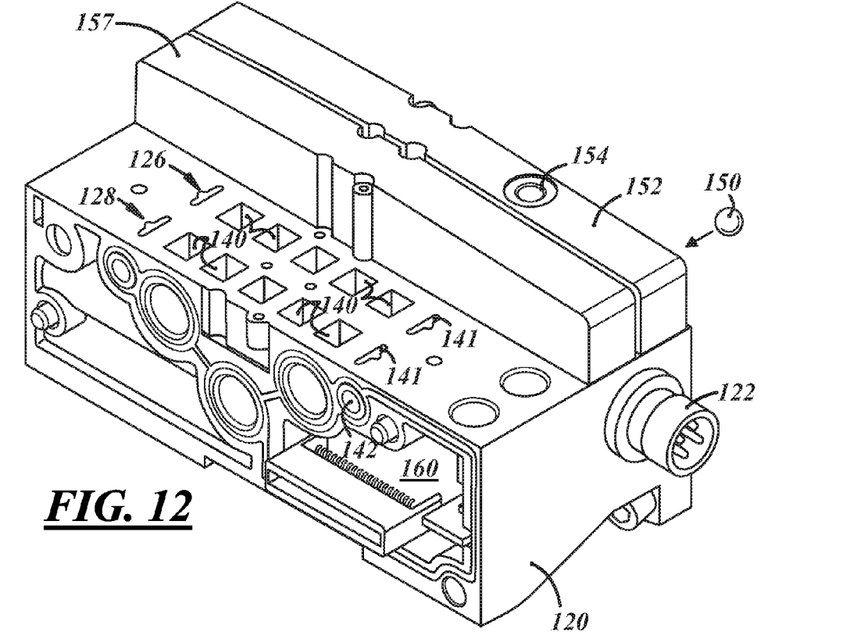
FIG. 12 is a perspective view of manifold block illustrating a second embodiment according to the invention.
Figures 13, 14:
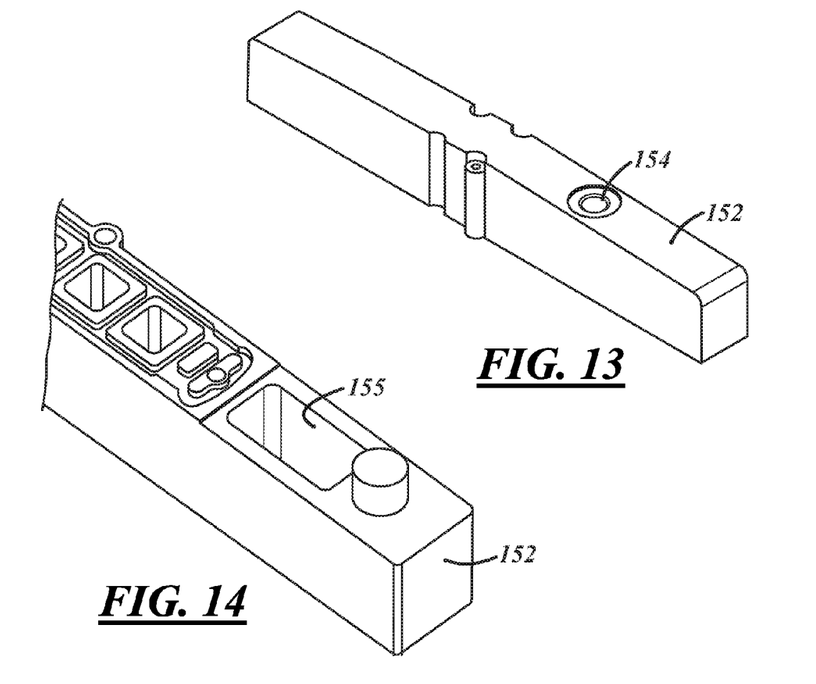
FIG. 13 is a top perspective view of the supply station cover as shown in FIG. 10 with the external pilot supply port.
FIG. 14 is a fragmentary bottom perspective view of the supply station cover shown in FIG. 13.

The manifold block 120 has an external electrical connector 122 and various ports 140 at the respective valve stations. Shown valve stations 126 and 128 can mount control valves 30. A pilot plug 150 in the form of a ball is press fitted into the end of the transverse pilot duct 142 to form the beginning of the valve zone and prevent communication from a previous manifold block and its pilot duct 142. An electrical connector 122 is similarly mounted as previously described electrical connector 22.

Figure 15:
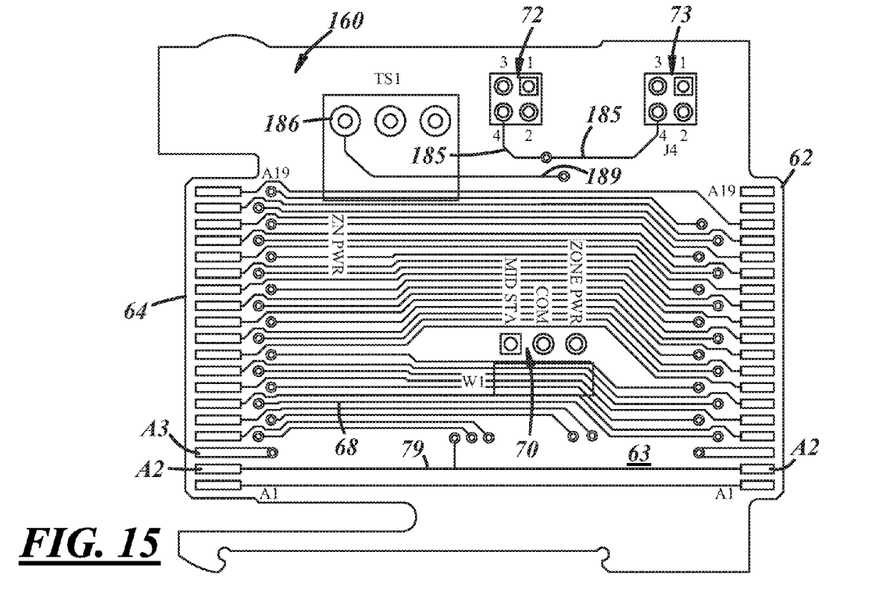
FIG. 15 an enlarged schematic view of the first face of the circuit board for the manifold shown in FIG. 10.
Figure 16:
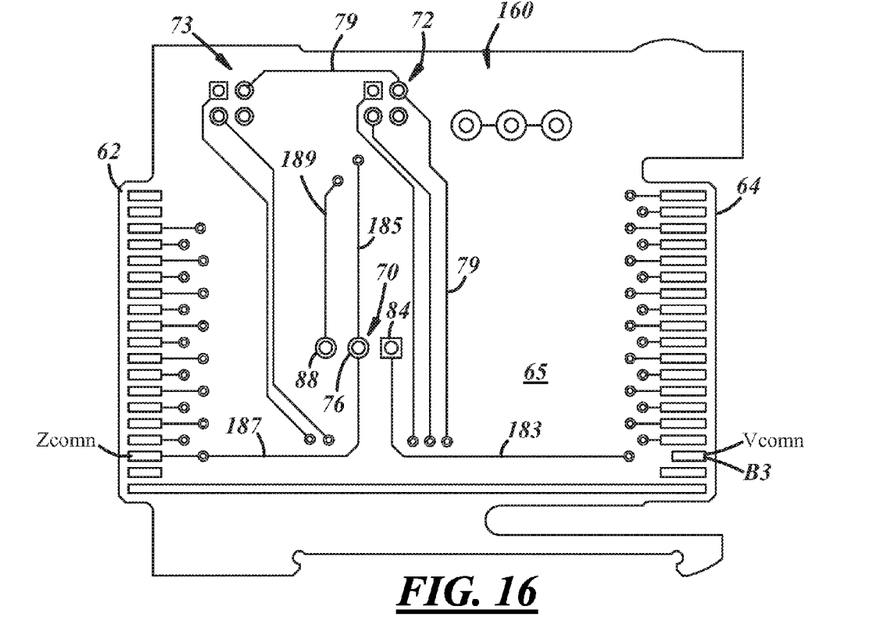
FIG. 16 is an enlarged schematic view of the second face of the circuit board shown in FIG. 15.

Control circuit board 160 is similarly stepped as circuit board 60 in order to serve the two valve stations 126 and 128 with dual solenoid valves. The comparable traces and contacts and jumper will carry the same numerals as the ones previously described for circuit board 60 and only the differences between the boards 60 and 160 will be explained in detail.

The Vcomn power at contact end A3 and B3 at edge 64 is connected to jumper station 70 at contact 84 through trace 183. Middle common contact 76 of jumper station 70 is connected to both sets of pins 72 and 73 through traces 185 and to Zcomn contact B3 and A3 at edge 62 through trace 187. Electrical connector 122 is connected to terminal 186 and through trace 189 is connected to jumper station 70 at contact 88.

Figure 17:
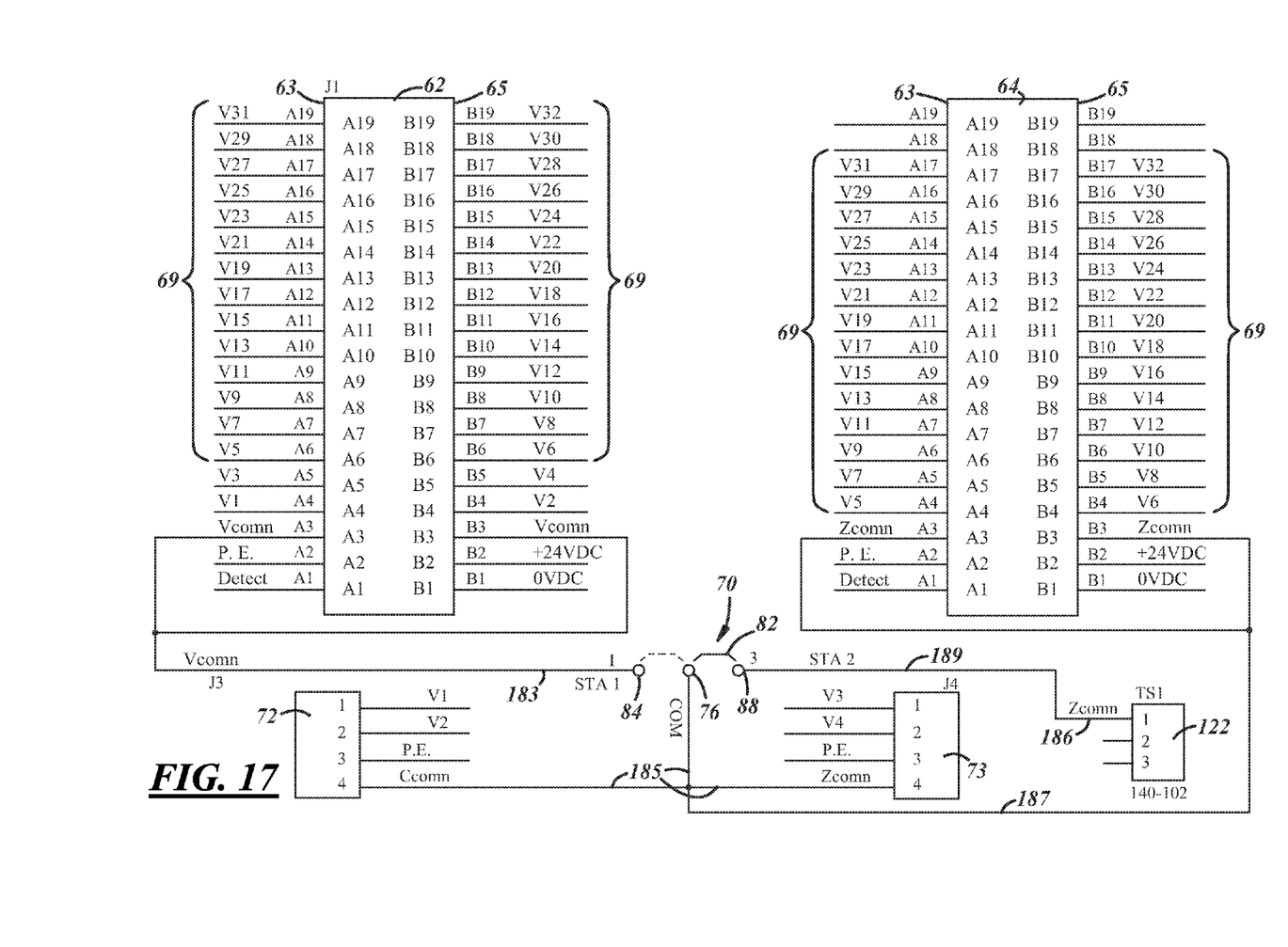
FIG. 17 is a schematic end view of the first and second edges of the circuit board as shown in FIG. 15 illustrating the terminals connections to respective circuits in the circuit board and the connection to the shunt in a first position and second position (in phantom).

As shown in FIG. 17, when it is desired to have the electrical powered supplied by electrical connector 122, the shunt 82 is moved to the right position and connects contact 88 with contact 76 at jumper station 70. In this fashion, both pin sets 72 and 73 receive the power from the electrical connector 122 through terminal 186. If on the other hand, when it is desired to have both stations 126 and 128 receive power from the Vcomn lines, the shunt 82 is positioned to the phantom position shown on the left. Both pins sets 72 and 73 now receive power via the Vcomn contacts A3 and B3 at edge 62. In this fashion, a circuit board 160 provides a choice as to electrical power sources that feed the valve stations 126 and 128 in block manifold 120.

Other variations and modifications are possible without departing from the scope and spirit of the present invention as defined by the appended claims.

The embodiments in which an exclusive property or privilege is claimed are defined as follows:

1. A valve manifold assembly having a plurality of manifold blocks connected together with valve stations on one surface of each manifold block, said valve stations being part of a first or second set of valve stations connected to a respective first pilot pressure or to a zoned pilot pressure, said valve manifold assembly comprising:
   a first pilot pressure supply being operably connectable to a first set of control valves that are electrically actuated;
   said first set of control valves being mounted to said first set of valve stations on said manifold blocks;
   a first pilot pressure passage being operably connectable to said first pilot pressure supply for supplying said first pilot pressure to said first set of valve stations of said valve manifold assembly;
   a second pilot pressure supply being operably connectable to a second set of control valves that are electrically actuated;
   said second set of control valves being mounted to said second set of valve stations on said manifold blocks; and
   a second pilot pressure passage being operably connectable to a pilot supply valve for selectively supplying said zoned pilot pressure to said second set of valve stations of said valve manifold assembly such that said second set of control valves may be deactuated if pilot pressure is shut off thereto while said first set of control valves remain connected to said first pilot pressure.

2. A valve manifold assembly as defined in claim 1 further comprising:
   said first pilot pressure passage being separated from said second pilot pressure passage by a closure within one of said manifold blocks.

3. A valve manifold assembly as defined in claim 2 further comprising:
   said closure being within said one manifold block that has at least two valve stations with one station being part of said first set of valve stations and the other valve station(s) of said one manifold block being part of said second set of valve stations.

4. A valve manifold assembly as defined in claim 3 further comprising:
   said closure being a seal member press fitted into a pilot bore separating said first pilot pressure passage from said second pilot pressure passage.

5. A valve manifold assembly as defined in claim 1 further comprising:
   a sandwich block interposed between one of said manifold blocks and one of said control valves;
   said sandwich block having an exterior connector to be connectable to said second pilot pressure supply from said pilot supply valve; and
   said sandwich block having a port in fluid connection to said exterior connector for introducing said zoned pilot pressure from said pilot supply valve to said one of said control valves.

6. A valve manifold assembly as defined in claim 5 further comprising:
said sandwich block having a passage from said port to said one of said manifold blocks to introduce pilot pressure to said second pilot pressure passage.

7. A valve manifold assembly as defined in claim 1 further comprising:
said first set of control valves being electrically actuated from a first electrical power supply; and
said second set of control valves being electrically actuated from a second electrical power supply.

8. A zoned fluid control system in a valve manifold system having a plurality of manifold blocks connected together and a plurality of control valves mounted to said manifold blocks with the control valves being electrically actuated and pilot pressure operated; said zoned fluid control system comprising:
said plurality of manifold blocks forming at least first and second separate pilot pressure passages of a respective first zone and second zone not connected to each other for supplying a respective first set and second set of said control valves with independently controlled first and second pilot pressures; and
a pilot supply valve for selectively supplying said second pilot pressure and shutting off pilot pressure to said second pilot pressure passage without affecting said first pilot pressure to said first pilot pressure passage thereby disabling said second set of control valves as a separate zone independent from said first set of control valves.

9. A zoned fluid control system as defined in claim 8 further comprising:
an electrical control circuit for independently supplying electrical power to said first set and second set of control valves such that in order for said second set of control valves to be actuated, said electrical control circuit needs to supply electrical power to said second set and said pilot supply valve must be open to supply pilot pressure to said second separate pilot pressure passage in said separate zone.

10. A zone fluid control system as defined in claim 9 further comprising:
said first and second pilot pressure passages being aligned through at least one of said manifold blocks.

11. A zone fluid control system as defined in claim 9 further comprising:
a manifold block at the beginning of a zone has an external fitting to be connected to an electrical power supply; and
a respective sandwich block being interposed between said manifold block and a control valve mounted thereon for supplying pilot pressure from said pilot supply valve to said second separate pilot pressure passage of said second zone.

12. A zone fluid control system as defined in claim 8 further comprising:
said first and second separate pilot pressure passages being aligned through at least one of said manifold blocks.

* * * * *